United States Patent
Vejlgaard

(10) Patent No.: US 7,151,820 B2
(45) Date of Patent: Dec. 19, 2006

(54) SYSTEM FOR AND METHOD OF DETECTING A CONNECTION OF A TEXT TELEPHONY (TTY) DEVICE TO A MOBILE PHONE

(75) Inventor: Benny Niels Vejlgaard, San Diego, CA (US)

(73) Assignee: Siemens Communications Inc., Boca Raton, FL (US)

( * ) Notice: Subject to any disclaimer, the term of this patent is extended or adjusted under 35 U.S.C. 154(b) by 297 days.

(21) Appl. No.: 09/957,346

(22) Filed: Sep. 20, 2001

(65) Prior Publication Data

US 2003/0053603 A1    Mar. 20, 2003

(51) Int. Cl.
*H04M 11/00*    (2006.01)

(52) U.S. Cl. .................. 379/52; 379/93.01; 379/93.05; 455/557

(58) Field of Classification Search .................. 379/52, 379/93.01, 93.05, 93.17–93.18, 93.15; 455/553.1, 455/557, 560, 566, 559, 533.1
See application file for complete search history.

(56) References Cited

U.S. PATENT DOCUMENTS

| | | | | |
|---|---|---|---|---|
| 5,127,041 A | * | 6/1992 | O'Sullivan .................. | 455/557 |
| 5,333,177 A | * | 7/1994 | Braitberg et al. ............ | 455/559 |
| 5,432,837 A | * | 7/1995 | Engelke et al. ............... | 379/52 |
| 5,710,806 A | | 1/1998 | Lee et al. ...................... | 379/96 |
| 5,729,204 A | * | 3/1998 | Fackler et al. ................ | 340/2.4 |
| 5,991,639 A | * | 11/1999 | Rautiola et al. ........... | 455/414.1 |
| 6,078,650 A | | 6/2000 | Hansen ........................ | 379/52 |
| 6,188,429 B1 | * | 2/2001 | Martin et al. ............ | 348/14.08 |
| 6,205,339 B1 | * | 3/2001 | Leung et al. ............. | 455/553.1 |
| 6,240,392 B1 | | 5/2001 | Butnaru et al. ............. | 704/271 |
| 6,345,251 B1 | * | 2/2002 | Jansson et al. ............. | 704/270 |
| 6,381,472 B1 | * | 4/2002 | LaMedica et al. .......... | 455/560 |
| 6,411,823 B1 | * | 6/2002 | Chen ........................... | 455/559 |

FOREIGN PATENT DOCUMENTS

JP    06-133308    *    5/1994

* cited by examiner

Primary Examiner—Melur Ramakrishnaiah

(57) ABSTRACT

A system for and method of detecting a connection of a text telephony (TTY) device to communication device, such as, a mobile telephone. The communication device provides a TTY bearer bit to its communication network upon detecting that a TTY device is connected to it. The connection between the communication device and the TTY device can be made using a smart cable or a connector cable. The detection that a TTY device is connected to the communication device is automatic and does not require the user of the communication device to enter a code or any other input to the communication device.

21 Claims, 4 Drawing Sheets

FIG. 1

SYSTEM FOR AND METHOD OF DETECTING A CONNECTION OF A TEXT TELEPHONY (TTY) DEVICE TO A MOBILE PHONE

FIELD OF THE INVENTION

The present invention relates generally to telecommunication technologies. More particularly, an exemplary embodiment of the present invention relates to a system for and a method of detecting a connection of a text telephony (TTY) device to a mobile phone.

BACKGROUND OF THE INVENTION

Text Telephony (TTY) has been used by hearing and speech impaired people for many years over the plain old telephone system (POTS). In recent years, TTY has been used over analog cellular phones using the advanced mobile phone system (AMPS) standard. In general, TTY devices use Baudot codes to signal text from one user to another over the regular voice channel.

Digital cellular phones improve network capacity by using voice coders that encode the voice at a mobile phone and decode it later in the network. Unfortunately, voice coders interfere with the TTY Baudot codes. Furthermore, additional functionality needs to be implemented in both mobile handsets and the network infrastructure in order to support TTY on digital networks.

TTY mobile device systems for the global system for mobile communications (GSM) standard exist. GSM, originally "Groupe de travail Spéciale pour les services Mobiles", is a standard for digital cellular communications that is currently in the process of being adopted by over 60 countries. The GSM standard currently uses the 900 MHz and 1800 MHz bands, as well as 1900 MHz bands in some countries. Similar implementation architecture exists for the other digital cellular networks.

TTY mobile device systems include mobile devices capable of signaling to a wireless network if the device does or does not support TTY at call setup. This notification is generally accomplished using a TTY bearer bit. The TTY bearer bit ensures that each TTY call is routed to the correct decoder/encoder in the network. A TTY mode switch in the mobile device must be present in order to minimize the number of calls being routed through the CTM decoder/TTY encoder. It is stated in Section 255 of the Telecom Act that in the United States manufacturers are required to provide a "usable" solution for users and not just a solution for 911 emergency calls. There are many possible solutions for the mode switch, but the selected solution should minimize the number of normal voice calls with the TTY bearer bit enabled and make easy access for the TTY user to enable the TTY mode switch.

Conventional TTY mobile device systems require users to enter a code or some other manual technique to indicate that a TTY device is connected to the mobile device or that the mobile device needs to be in TTY mode. Manually informing the mobile device of the TTY connection or TTY mode is cumbersome and time consuming. Further, the manual technique must be repeatedly used if the mobile device frequently uses both TTY and non-TTY communications.

Thus, there is a need for a system for and method of detecting a connection of a text telephony (TTY) device to a mobile phone. Further, there is a need to detect the presence of a TTY cable connection upon its attachment such that the mobile device can communicate a TTY bearer bit to its wireless network. Yet further, there is a need to enable the TTY bearer bit dynamically.

SUMMARY OF THE INVENTION

The present invention relates to communications systems and methods where a text telephony (TTY) device is connected to a communication device, such as, a mobile telephone. The communication device provides a TTY bearer bit to its network upon detecting that a TTY device is connected to it. The connection between the communication device and the TTY device can be made using a smart cable or a connector cable. The detection that a TTY device is connected to the communication device is automatic and does not require the user of the communication device to enter a code or any other input to the communication device.

The present invention further relates to a technique for setting the TTY bearer bit based upon the detection of the attachment of a TTY device or a TTY encoder/decoder implemented in an accessory on call setup (both mobile originated and mobile terminated). The technique can be implemented in many ways, such as, placing the TTY encoder/decoder in a mobile handset or in a smart cable attachment. An exemplary embodiment involves a mobile device automatically detecting when a TTY device or a smart cable attachment is connected to the mobile phone. The TTY device can be added to the mobile phone as an attachment to reduce the implementation effort in the mobile phone. The technique applies to GSM but is also relevant for other digital cellular standards.

An exemplary embodiment of the invention is related to a method of detecting a connection of a text telephony (TTY) device to a communication device. The method can include receiving a physical connection with a cable coupling a TTY device and a communication device, automatically detecting the physical connection at the communication device, and communicating a TTY bearer bit to a network. The TTY device provides text entry and text display and enables communication on a communication network. The communication device communicates with a communication network and includes input/output connection ports.

Another exemplary embodiment of the invention is related to a system for detecting a connection of a text telephony (TTY) device to a mobile device. This system can include a mobile device, a TTY device, and a connection. The mobile device communicates with a wireless network and the mobile device includes input/output connection ports. The TTY device provides text entry and text display and enables communication on the wireless network. The connection couples the mobile device and the TTY device. The connection dynamically enables the communication of a TTY bearer bit by the mobile device to the wireless network, enabling TTY communications among the mobile device, TTY device, and the wireless network.

An exemplary embodiment of the invention is related to a system for detecting a connection of a text telephony (TTY) device to a communication device. The system can include means for receiving a physical connection with a cable coupling a TTY device and a communication device, means for automatically detecting the physical connection at the communication device, and means for communicating a TTY bearer bit to a communication network. The TTY device provides text entry and text display and enables communication on a communication network. The communication device communicates with the communication network and includes input/output connection ports.

Other principle features and advantages of the invention will become apparent to those skilled in the art upon review of the following drawings, the detailed description, and the appended claims.

BRIEF DESCRIPTION OF THE DRAWINGS

Exemplary embodiments of the invention will hereafter be described with reference to the accompanying drawings, wherein like numerals denote like elements, and.

DETAILED DESCRIPTION OF THE EXEMPLARY EMBODIMENTS

A system for and methods of detecting a connection of a text telephony (TTY) device to a communication device are described. In the following description, for purposes of explanation, numerous specific details are set forth in order to provide a thorough understanding of the present invention. It will be evident, however, to one skilled in the art that the exemplary embodiments may be practiced without these specific details. In other instances, structures and devices are shown in block diagram form in order to facilitate description of the exemplary embodiments.

In one embodiment, a computer system can be used which has a processor or a central processing unit (CPU) that executes sequences of instructions contained in a memory. More specifically, execution of the sequences of instructions causes the CPU to perform steps, which are described below. The instructions may be loaded into a random access memory (RAM) for execution by the CPU from a read-only memory (ROM), a mass storage device, or some other persistent storage. In other embodiments, hardwired circuitry may be used in place of, or in combination with, software instructions to implement the functions described. Thus, the embodiments described herein are not limited to any specific combination of hardware circuitry and software, nor to any particular source for the instructions executed by the computer system.

Figure 1:
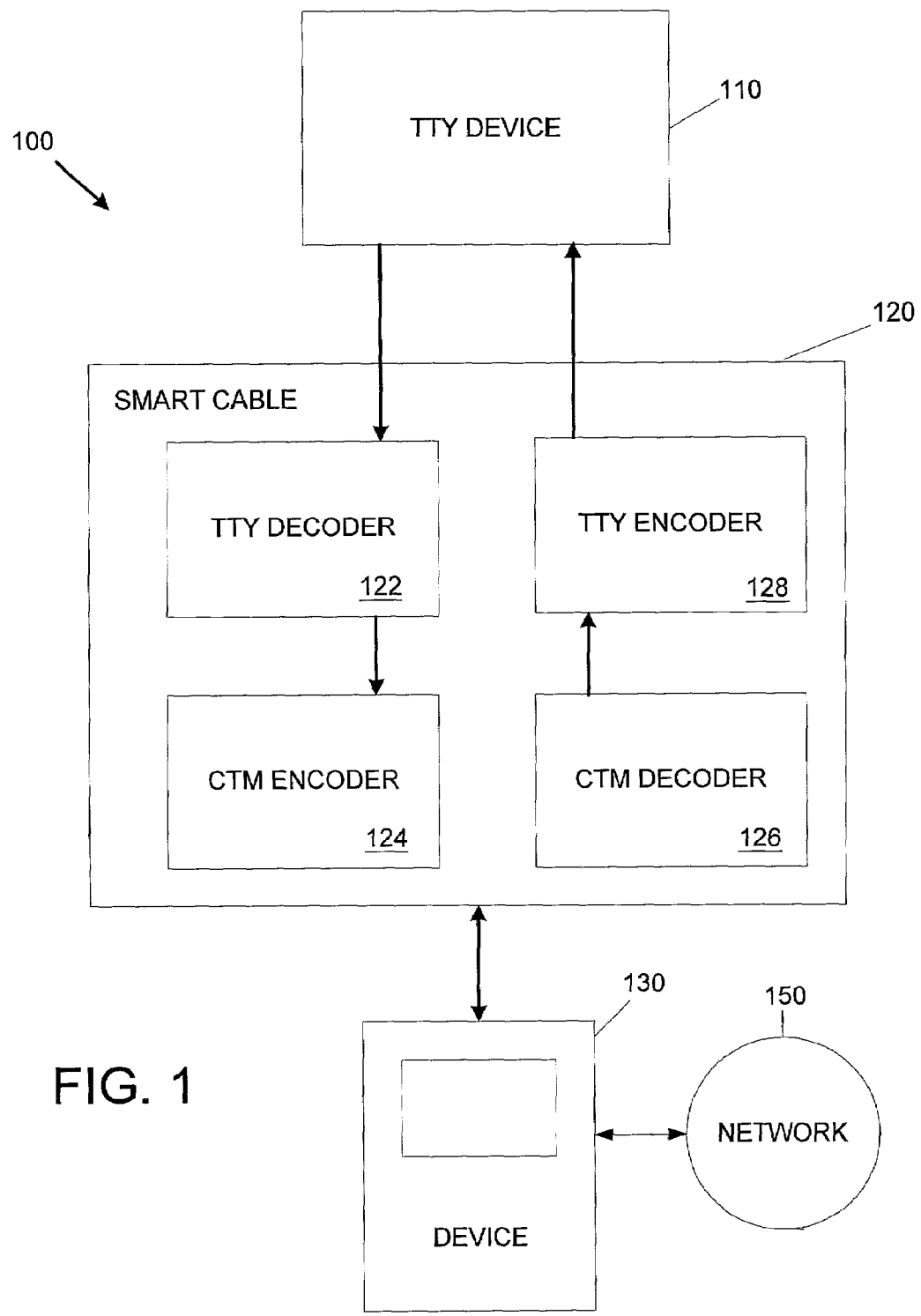
FIG. 1 is a diagrammatical representation of a text telephony (TTY) implementation for a global system for mobile communications (GSM) handset according to an exemplary embodiment.

FIG. 1 illustrates a TTY device system 100 in accordance with an exemplary embodiment. TTY device system 100 can include a TTY device 110, a smart cable 120, and a device 130. TTY device 110 can be any of a variety of devices capable of communicating TTY signals, such as Baudot codes. Smart cable 120 can include a TTY decoder 132 and a CTM (cell transfer matrix) encoder 134 for communications from TTY device 110 to device 130 and a CTM decoder 136 and a TTY encoder 138 for communications from device 130 to TTY device 110. Alternatively, TTY decoder 132, CTM encoder 134, CTM decoder 136, and TTY encoder 138 can be integrated into device 130.

Smart cable 120 can be any cable with a built-in processor or, alternatively, a data cable with compression and converting capabilities. Preferably, smart cable 120 provides a digital link or connection between TTY device 110 and device 130.

Device 130 is preferably a digital telephone, but could also be a personal digital assistant, a laptop computer, or any other of a variety of devices capable of communication. In an exemplary embodiment, device 130 includes an input/output (I/O) connector that is configured to receive smart cable 120. When an accessory is attached to the I/O connector, device 130 detects the presence of the accessory and identifies what accessory it is. Device 130 can detect the presence of smart cable 120 in many different ways. For example, device 130 can detect smart cable 120 by communicating a signal to smart cable 120 and getting a response signal from a microcontroller or processor included in smart cable 120.

Once device 130 determines that smart cable 120 is connected, notification can be provided to a network 150 associated with device 130 that smart cable 120 and device 130 are interconnected. Network 150 can be any of a variety of communication networks, such as, a corporate telecommunications network or any digital telephone network. Based on this notification, a TTY bearer bit can be enabled. As such, network 150 can be configured to route TTY calls to the correct decoder/encoder located in network 150. Furthermore, device 130 can minimize the number of calls being routed through the CTM decoder/TTY encoder.

Figure 2:
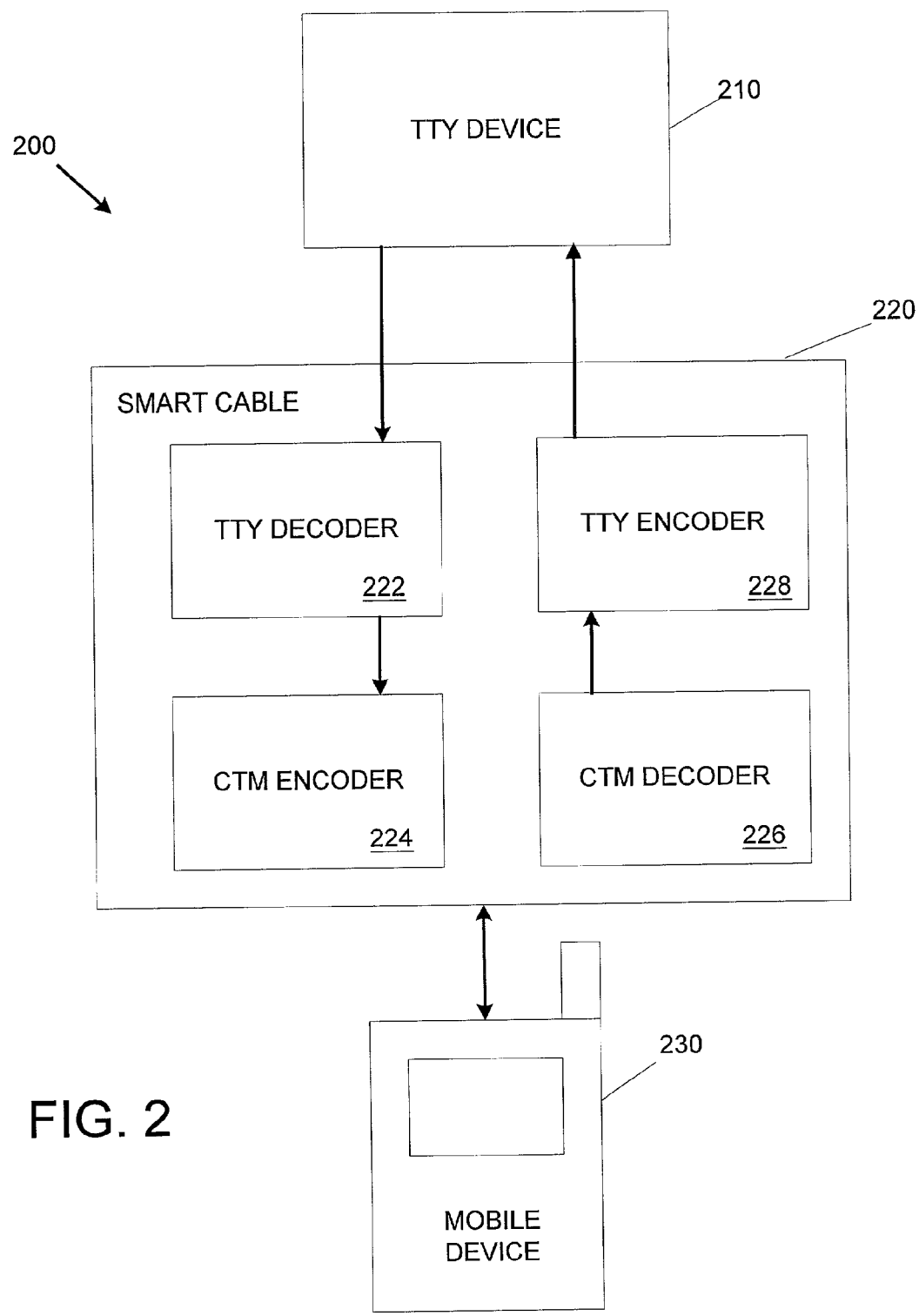
FIG. 2 is a diagrammatical representation of an TTY implementation for a GSM handset according to an exemplary embodiment.

FIG. 2 illustrates a TTY mobile device system 200 in accordance with an exemplary embodiment. TTY mobile device system 200 can include a TTY device 210, a smart cable 220, and a mobile device 230. TTY device 210 can be any of a variety of devices capable of communicating TTY signals, such as Baudot codes. Smart cable 220 can include a TTY decoder 232 and a CTM (cell transfer matrix) encoder 234 for communications from TTY device 210 to mobile device 230 and a CTM decoder 236 and a TTY encoder 238 for communications from mobile device 230 to TTY device 210.

Smart cable 220 can be any cable with a built-in processor or, alternatively, a data cable with compression and converting capabilities. One such smart cable with a built-in processor for connectivity between legacy TTY devices and standard mobile phones is manufactured and sold by Telesta, Inc. of Andover, Mass., USA.

Mobile device 230 is preferably a mobile telephone, but could also be a wireless personal digital assistant, a laptop computer, or any other of a variety of communication devices. Mobile device 230 can be a GSM 850/1900 mobile phone supporting TTY, a TDMA/CDMA mobile phone supporting TTY, or similar applications for mobile telephony.

In an exemplary embodiment, mobile device 230 includes an input/output (I/O) connector. When an accessory, such as smart cable 220 is attached to the I/O connector, mobile device 230 detects the presence of the accessory and identifies what accessory it is. Mobile device 230 can detect the presence of smart cable 220 in many different ways. In an exemplary embodiment, mobile device 230 can detect that a TTY cable is attached to it because smart cable 220 includes a microcontroller or processor that responds to a message from mobile device 230.

In an alternative embodiment, mobile device 230 can detect smart cable 220 by detecting if any one of the input/output pins on mobile device 230 are set to a different voltage +/− Vcc. A different voltage indicates a connection to a cable. In yet another embodiment, mobile device 230 can detect a resistor value being placed in the input/output (I/O) connector to recognize a connected cable. A variety of other techniques may be employed. Once mobile device 230 determines that smart cable 220 is connected, notification is provided to the wireless network that smart cable 220 and mobile device 230 are interconnected. Based on this notification, the TTY bearer bit can be enabled. Mobile device 230 enables TTY functionality by communicating the TTY bearer bit to a network associated with mobile device 230.

As explained above, the TTY bearer bit must be enabled in order for all network implementations to work with TTY. The TTY bearer bit enables the routing of the TTY call through a CTM decoder followed by an encoder. Once the TTY functionality is not required, such as when smart cable 220 is detached or when a TTY communication is ended, mobile device 230 disables the TTY bearer bit. As such, mobile device 230 enables the TTY bearer bit dynamically.

Figure 3:
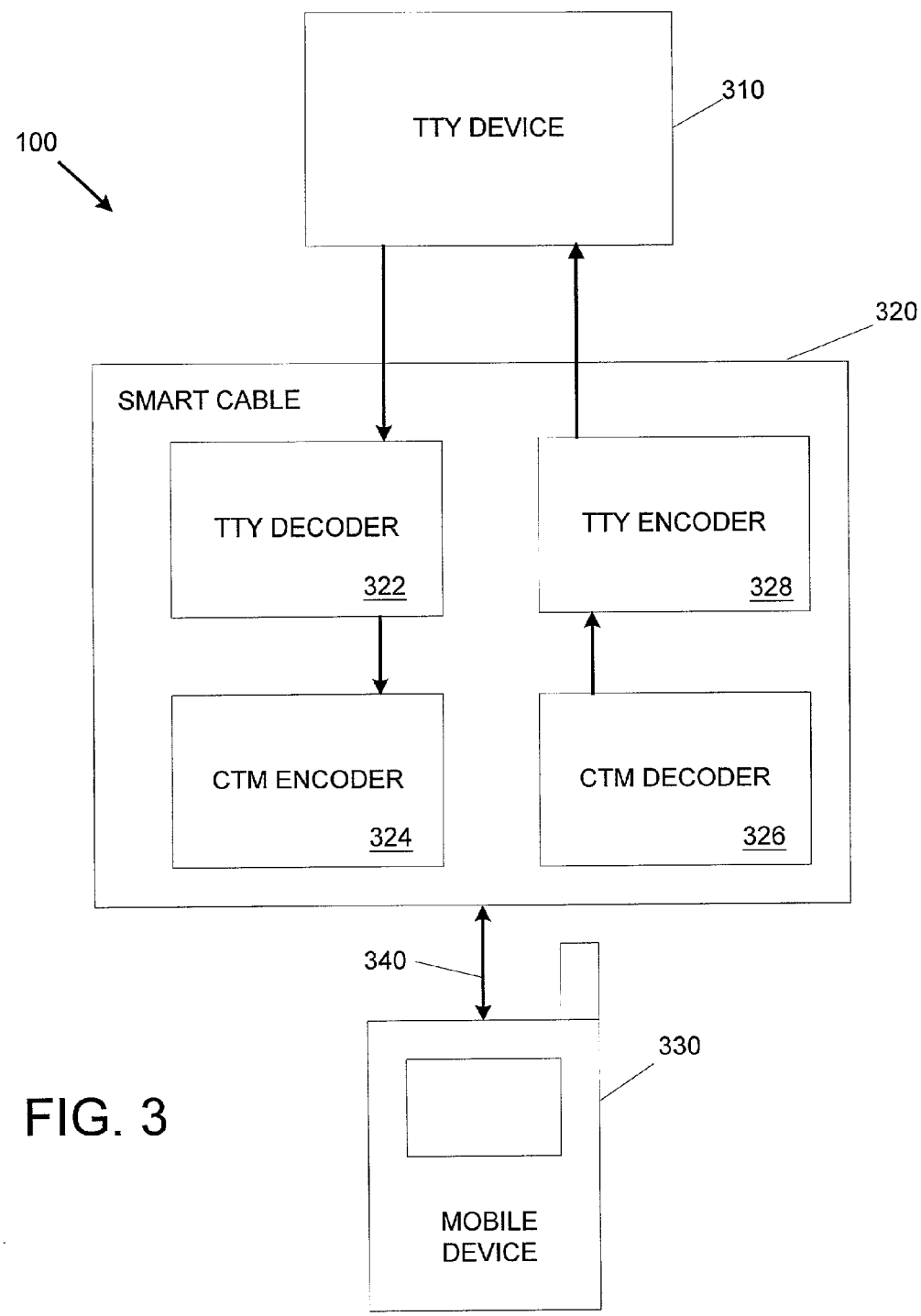
FIG. 3 is a diagrammatical representation of an TTY implementation for a GSM handset according to another exemplary embodiment.

FIG. 3 illustrates a TTY mobile device system 300 in accordance with another exemplary embodiment. TTY mobile device system 300 can include a TTY device 310, a smart cable 320, and a mobile device 330. Smart cable 320 can include a TTY decoder 332 and a CTM encoder 334 for communications from TTY device 310 to mobile device 330 and a CTM decoder 336 and a TTY encoder 338 for communications from mobile device 330 to TTY device 310.

Smart cable 320 can also be configured to attach to mobile device 330 via a connector 340. In an exemplary embodiment, connector 340 is a 2.5 mm jack. In this embodiment, connector 340 provides the indication to mobile device 330 of the connection to TTY device 310. Connector 340 can provide such indication using the input/output (I/O) connector on mobile device 330. Any of a variety of methods can be used to make the detection. For example, mobile device 310 can detect if the pins of the I/O connector are set to a different voltage. After smart cable 320 is identified, TTY notifications can be made by mobile device 330. Based on these notifications, the TTY bearer bit can be enabled.

Figure 4:
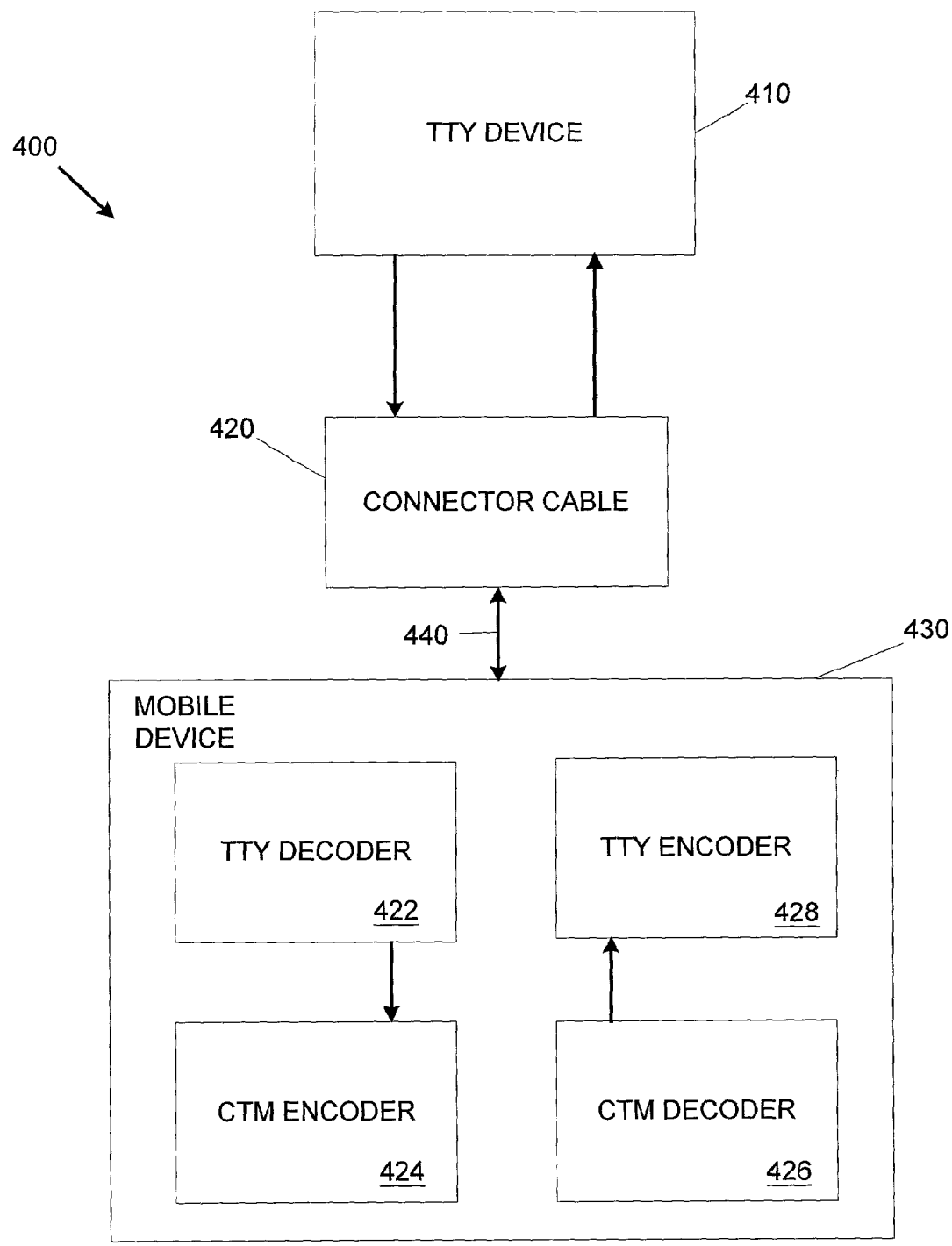
FIG. 4 is a diagrammatical representation of an TTY implementation for a GSM handset according to yet another exemplary embodiment.

FIG. 4 illustrates a TTY mobile device system 400 in accordance with another exemplary embodiment. TTY mobile device system 400 can include a TTY device 410, a connector cable 420, and a mobile device 430. Mobile device 430 can include an integrated TTY decoder 432 and a CTM encoder 434 for communications from TTY device 410 to mobile device 430 and a CTM decoder 436 and a TTY encoder 438 for communications from mobile device 430 to TTY device 410.

Where the TTY/CTM decoder/encoder is integrated into mobile device 430, TTY device 410 can be connected to mobile device 430 via a connector 440. In an exemplary embodiment, connector 440 is a 2.5 mm jack. Connector 440 provides an indication of the connection to TTY device 410. Connector 440 can provide such indication using the input/output (I/O) connector on mobile device 430. As a person of skill in the art would appreciate, I/O connectors are different depending on the type of mobile device 430. For example, different manufacturers have different proprietary standards for the I/O connector. Preferably, connector 440 can interface with the I/O connector of any mobile device, irregardless of the standard used. Connector 440 provides the means for interfacing TTY device 410 with TTY connector cable 420 and the means for facilitating the identification of TTY connector cable 420 by mobile device 430.

Advantageously, the system and methods described with reference to FIGS. 2–4 provide for detecting a connection of a text telephony (TTY) device to a mobile phone. Moreover, the system and method detect the presence of a TTY cable connection upon its attachment such that the mobile device can communicate a TTY bearer bit to its wireless network. Accordingly, the system and method enable the TTY bearer bit dynamically.

While the exemplary embodiments illustrated in the figures and described above are presently preferred, it should be understood that these embodiments are offered by way of example only. Other embodiments may include, for example, a variety of different smart cables. The invention is not limited to a particular embodiment, but extends to various modifications, combinations, and permutations that nevertheless fall within the scope and spirit of the appended claims.

What is claimed is:

1. A method of detecting a connection of a text telephony (TTY) device to a communication device, the method comprising:

receiving a physical connection with a cable coupling the TTY device and the communication device, the TTY device providing text entry and text display and enabling communication on a communication network, the communication device communicating with the communication network and including input/output connection ports, the cable being a smart cable and including a processor;

automatically detecting the physical connection at the communication device based on said smart cable;

in response to the detection of the physical connection, communicating a TTY bearer bit to the communication network; and decoding and encoding TTY signals in the smart cable.

2. The method of claim 1, wherein the communication network is a wireless network and the communication device is a mobile communication device.

3. The method of claim 1, wherein the communication network is a digital network.

4. The method of claim 1, wherein the step of automatically detecting the physical connection at the communication device includes detecting whether a voltage on input/output connector pins of the communication device changes, the voltage changes being due to a voltage change provided by said smart cable.

5. The method of claim 1, wherein the step of automatically detecting the physical connection at the communication device includes detecting a resistor value in an input/output connector of the communication device, to thereby recognize said smart cable.

6. The method of claim 1, wherein the communication device comprises a mobile phone.

7. The method of claim 6, wherein the mobile phone includes an integrated text telephony/cell transfer matrix (TTY/CTM) encoder/decoder.

8. The method of claim 1, wherein the cable includes an integrated text telephony/cell transfer matrix (TTY/CTM) encoder/decoder.

9. The method of claim 1, wherein the physical connection with the cable includes a 2.5 mm connector.

10. A method of detecting a connection of a text telephony (TTY) device to a communication device, the method comprising:

receiving a physical connection with a cable coupling the TTY device and the communication device, the TTY device providing text entry and text display and enabling communication on a communication network, the communication device communicating with the communication network and including input/output connection ports;

automatically detecting the physical connection at the communication device, wherein the step of automatically detecting the physical connection at the communication device includes communicating a signal from the communication device to the cable and receiving a response signal from the cable at the communication device, the cable including a processor;

in response to detection of the physical connection, communicating a TTY bearer bit to the communication network; and decoding and encoding TTY signals in the cable.

11. A system for detecting a connection of a text telephony (TTY) device to a mobile device, the system comprising:

a mobile device that communicates with a wireless network, the mobile device including input/output connection ports;

a TTY device that provides text entry and text display and enables communication on the wireless network; and a connection coupling the mobile device and the TTY device, wherein the connection includes a processor therein and is configured to decode and encode TTY signals, and the connection dynamically enables the communication of a TTY bearer bit by the mobile device to the wireless network, enabling TTY communications among the mobile device, TTY device, and the wireless network.

12. The system of claim 11, wherein the mobile device comprises a telephone.

13. The system of claim 12, wherein the telephone includes an integrated text telephony/cell transfer matrix (TTY/CTM) encoder/decoder.

14. The system of claim 11, wherein the connection coupling the mobile device and the TTY device is a smart cable including a TTY decoder, a cell transfer matrix (CTM) encoder, a CTM decoder, and a TTY encoder.

15. A system for detecting a connection of a text telephony (TTY) device to a mobile device, the system comprising:

a mobile device that communicates with a wireless network, the mobile device including input/output connection ports;

a TTY device that provides text entry and text display and enables communication on the wireless network; and a connection coupling the mobile device and the TTY device, wherein the connection is configured to decode and encode TTY signals and dynamically enables the communication of a TTY bearer bit by the mobile device to the wireless network, enabling TTY communications among the mobile device, TTY device, and the wireless network;

wherein the connection dynamically enables the communication of the TTY bearer bit by sending a response signal to the mobile device upon receipt of a query signal from the mobile device.

16. A system for detecting a connection of a text telephony (TTY) device to a mobile device, the system comprising:

a mobile device that communicates with a wireless network, the mobile device including input/output connection ports;

a TTY device that provides text entry and text display and enables communication on the wireless network; and a connection coupling the mobile device and the TTY device, wherein the connection is configured to decode and encode TTY signals and dynamically enables the communication of a TTY bearer bit by the mobile device to the wireless network, enabling TTY communications among the mobile device, TTY device, and the wireless network;

wherein the connection dynamically enables the communication of the TTY bearer bit by changing the voltage on input/output connector pins of the mobile device.

17. A system for detecting a connection of a text telephony (TTY) device to a communication device, the system comprising:

a cable configured to decode and encode TTY signals;

means for receiving a physical connection with the cable coupling the TTY device and the communication device, the TTY device providing text entry and text display and enabling communication on a communication network, the communication device communicating with the communication network and including input/output connection ports;

means for automatically detecting the physical connection at the communication device based on an indication provided by circuitry of said cable; and means for communicating a TTY bearer bit to the communication network.

18. The system of claim 17, wherein the communication device includes a mobile phone.

19. The system of claim 18, wherein the mobile phone includes an integrated text telephony/cell transfer matrix (TTY/CTM) encoder/decoder.

20. The system of claim 17, wherein the means for automatically detecting the physical connection at the communication device includes means for detecting whether a voltage on input/output connector pins of the communication device changes.

21. A system for detecting a connection of a text telephony (TTY) device to a communication device, the system comprising:

a cable configured to decode and encode TTY signals;

means for receiving a physical connection with the cable coupling the TTY device and the communication device, the TTY device providing text entry and text display and enabling communication on a communication network, the communication device communicating with the communication network and including input/output connection ports;

means for automatically detecting the physical connection at the communication device; and means for communicating a TTY hearer bit to the communication network;

wherein the means for automatically detecting the physical connection at the communication device includes means for communicating a signal from the communication device to the cable and receiving a response signal from the cable at the communication device, the cable including a processor.

* * * * *